(12) United States Patent
Shimizu

(10) Patent No.: US 6,281,030 B1
(45) Date of Patent: Aug. 28, 2001

(54) FABRICATION OF SEMICONDUCTOR MACH-ZEHNDER MODULATOR

(75) Inventor: Junichi Shimizu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/580,896

(22) Filed: May 30, 2000

Related U.S. Application Data

(62) Division of application No. 09/085,840, filed on May 28, 1998, now Pat. No. 6,122,414.

(30) Foreign Application Priority Data

May 28, 1997 (JP) .................................... 9-138505

(51) Int. Cl.⁷ .................................................. H01L 21/00
(52) U.S. Cl. .................................................. 438/31
(58) Field of Search ............................ 438/29, 30, 31, 438/32, 39, 40, 41; 359/237, 248; 385/2, 3, 4, 8, 9

(56) References Cited

U.S. PATENT DOCUMENTS 5,524,076 * 6/1996 Rolland et al. ................... 385/8
5,778,113 * 7/1998 Yu ..................................... 385/3

FOREIGN PATENT DOCUMENTS 2 230 616 A * 10/1990 (GB) .

OTHER PUBLICATIONS

Walker, R.G., "Novel push–pull drive for broadband electro–optic modulators in III–V materials", European Conference on Optical Communication 6B, IEE vol. conf. 14, pp. 565–568 (no month given), 1988.*

* cited by examiner

Primary Examiner—Keith Christianson
(74) Attorney, Agent, or Firm—Hutchins, Wheeler & Dittmar

(57) ABSTRACT

A semiconductor Mach-Zehnder modulator comprises a pair of phase modulator arm waveguides and a single driver for a push-pull modulation. A first electrode connected to p-type cladding layer of first modulator arm is maintained at a negative potential $V_\pi$, a second electrode connected to n-type cladding layer of first modulator arm and p-type cladding layer of second modulator arm is driven by a drive voltage, and a third electrode connected to n-type cladding layer of second modulator arm is maintained at a ground potential. The drive voltage changes between $V_\pi$ and $V_{\pi/2}$ for push-pull modulation of both modulator arms.

6 Claims, 15 Drawing Sheets

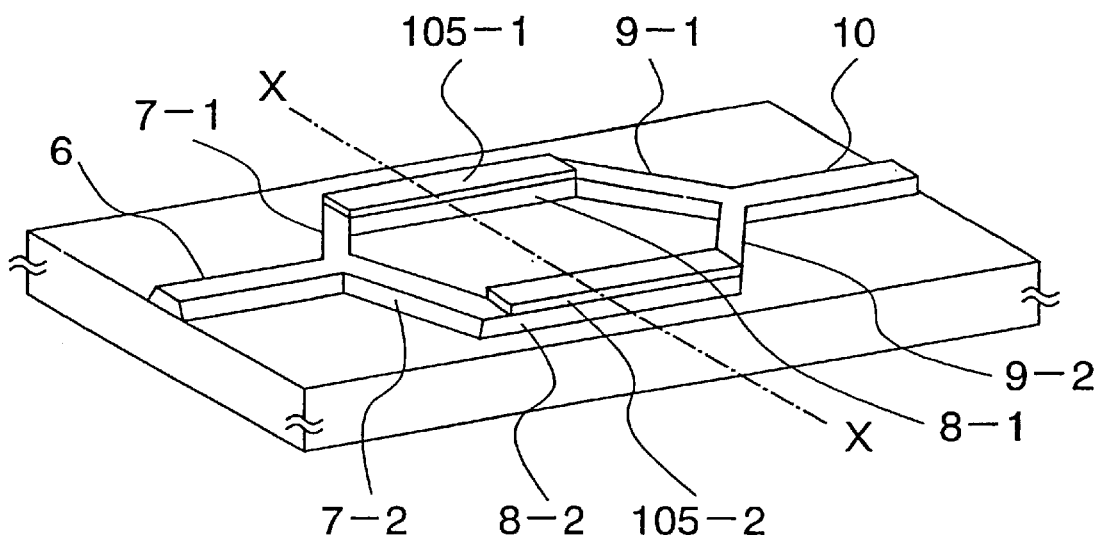
FIG. IA PRIOR ART
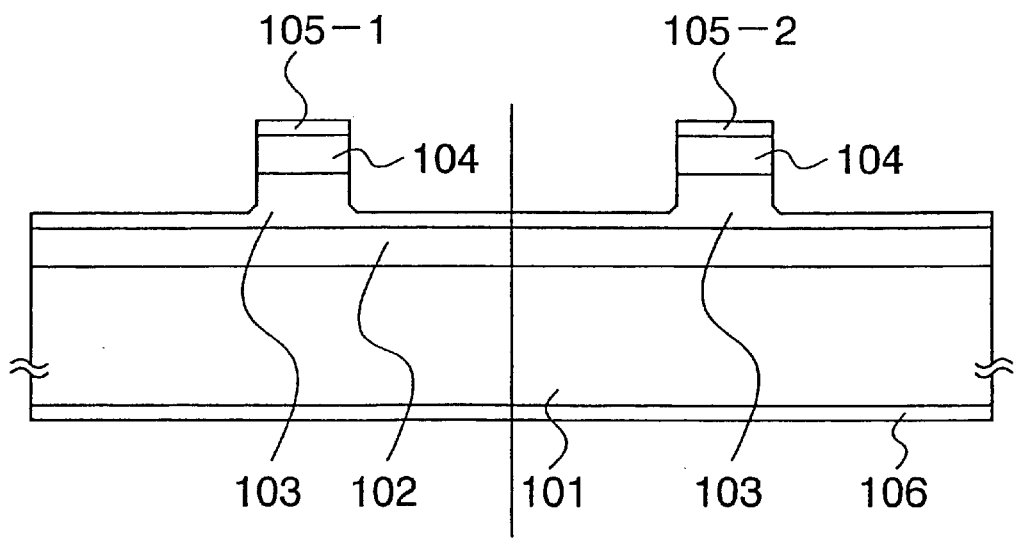
FIG. IB PRIOR ART

FABRICATION OF SEMICONDUCTOR MACH-ZEHNDER MODULATOR

CROSS REFERENCE TO RELATED APPLICATIONS

This application is a divisional of U.S. patent application Ser. No. 09/085,840 filed May 28, 1998, now U.S. Pat. No. 6,122,414.

BACKGROUND OF THE INVENTION (a) Field of the Invention

The present invention relates to a semiconductor Mach-Zehnder modulator and, more particularly, to a semiconductor Mach-Zehnder modulator for use in an optical communication systems or optical data processing systems and driven with a single driver in a push-pull modulation scheme.

(b) Description of the Related Art

Recently, optical communication techniques are directed more and more to high bit-rate transmission. In the optical communication systems, most optical fibers installed in the world, especially around the North America, are 1.3 µm zero dispersion fiber, and provides minimum loss in 1.55 µm range in these fibers. Conventionally, a semiconductor laser direct modulation technique has been generally used in the optical communication. This technique, however, involves wavelength chirping due to dispersion when a high bit-rate 1.55 µm range optical signal is transmitted through a 1.3 µm zero dispersion fibers, thereby causing a signal distortion. The level of the distortion is generally proportional to a (bit rate)$^2$×(transmission distance) product.

The problem wavelength chirping can be solved to some extent by employing an external modulation technique. Among other external modulators, an absorption type modulator exhibits smaller chirping compared to semiconductor lasers; however, not zero. On the other hand, if a Mach-Zehnder modulator, which uses optical interference as its operational principle, is used as an external modulator operating in a push-pull modulation scheme, the wavelength chirping can be entirely removed theoretically. Accordingly, Mach-Zehnder modulators are expected to be key external modulators for use in ultra high-speed and long distance optical communication systems.

Some known Mach-Zehnder modulators have dielectric substances such as LiNbO$_3$. On the other hand, semiconductor Mach-Zehnder modulators are considered to be advantageous over the dielectric type Mach-Zehnder modulators, in view of the integration capability with optical elements such as semiconductor lasers or semiconductor optical amplifiers and electric elements such as FETs, as well as in view of their smaller dimensions and lower power consumption. FIG. 1A shows a conventional semiconductor Mach-Zehnder modulator in a perspective view, and FIG. 1B is a cross-sectional view taken along X—X in FIG. 1A.

The semiconductor Mach-Zehnder modulator of FIG. 1A comprises an input waveguide 6, a pair of input branch waveguides 7-1 and 7-2 branching off input waveguide 6, a pair of phase modulators 8-1 and 8-2 receiving inputs from respective branch waveguides 7-1 and 7-2, a pair of output branch waveguides 9-1 and 9-2 receiving outputs from respective phase modulators 8-1 and 8-2, and an output waveguide 10 receiving combined output from output branch waveguides 9-1 and 9-2.

The Mach-Zehnder modulator of FIG. 1A is fabricated by depositing consecutively undoped InP layer 102, undoped In$_x$Ga$_{1-x}$As$_y$P$_{1-y}$ layer 103 ($\lambda_{PL}$=1.3 µm), p-type InP layer 104 on an n-type InP substrate 101, patterning specified deposited layers to form a combined mesa structure, and forming independent drive electrodes 105-1 and 105-2 and a common electrode 106 of the phase modulators, as shown in FIG. 1B.

The semiconductor Mach-Zehnder modulator generally uses changes in the refractive index generated upon a reverse-bias voltages applied to a p-n junction. The optical characteristic of the semiconductor Mach-Zehnder modulator is shown in FIG. 2, wherein the optical output thereof is plotted against the drive voltage (reverse bias voltage). The curve denoted by "V1" shows a single arm drive wherein one of the modulators is driven, whereas the curve denoted by "V1 & V2" shows a double arm drive wherein both the modulators are driven for a push-pull modulation.

FIG. 3 shows a timing chart for the push-pull modulation of the modulator such as shown in FIGS. 1A and 1B, wherein modulator 8-1 is applied with a reverse bias voltage V1 through electrode 105-1 changing between 0 and $V_{\pi/2}$ whereas modulator 8-2 is applied with a reverse bias voltage V2 through electrode 105-2 changing between $V_{\pi/2}$ and $V_{\pi}$ in opposite phase with respect to the voltage V1, wherein $V_{\pi}$ provides a phase shift of π to the phase modulator whereas $V_{\pi/2}$ provides a phase shift of π/2. As shown in FIG. 2, drive voltage for the double arm modulation (V1 & V2), i.e., push-pull modulation, is about a half of that for the single arm modulation (V1) for a specified optical output.

John C. Cartledge et al. report that a double arm modulation scheme achieves a transmission distance which is double the transmission distance obtained by a single arm modulation scheme, in an article "Dispersion Compensation for 10 Gb/s Lightwave Systems Based on a Semiconductor Mach-Zehnder Modulator", IEEE Photonics Technology. Letters, 1995 February, Vol. 7, No. 2, pp 224–226.

FIG. 4 shows full pulse width (ps) at half maximum for a Gauss pulse plotted against fiber length (km) for a single arm modulation and a double arm (push-pull) modulation of the Mach-Zehnder modulator, obtained in our experiments. As understood from FIG. 4, push-pull modulation achieves a small waveform distortion due to pulse compression and thus maintains a half-value width better than a single arm modulation. From the results, it is considered that the push-pull modulation can provide a double or triple transmission distance compared to the single arm modulation.

A push-pull driven semiconductor Mach-Zehnder modulator, such as 301 shown in FIG. 5, generally requires a pair of drivers 200-1 and 200-2 for applying drive voltages to electrodes 302 and 303 of the respective phase modulators and a timing generator 203 for driving the phase modulators 301 exactly in opposite phases. It is difficult to accurately adjust the timing by the timing generator 203, especially at higher frequencies, for example, over 2.5 Gb/s, which fact renders the operation of the phase modulator arms to be difficult at such high frequencies.

SUMMARY OF THE INVENTION

It is therefore an object of the present invention to provide a semiconductor Mach-Zehnder modulator which is capable of operating in a push-pull modulation by using a single driver at higher frequencies over 2.5 Gb/s.

It is another object of the present invention to provide a method for manufacturing such a semiconductor Mach-Zehnder modulator.

The present invention provides a semiconductor Mach-Zehnder modulator comprising a substrate and a combination waveguide overlying the substrate, the combination waveguide including an input optical waveguide, first and second input branch optical waveguides branching off the input optical waveguide, first and second modulator arm waveguides optically coupled to the first and second input branch optical waveguides, respectively, first and second output branch optical waveguides optically coupled to the first and second modulator arm waveguides, respectively, and an output optical waveguide optically coupled to both the first and second output branch optical waveguides, each of the waveguides having a first cladding layer of a first conductivity type, a second cladding layer of a second conductivity type and an undoped optical guide layer sandwiched between the first cladding layer and the second cladding layer, the first modulator arm waveguide having a first electrode electrically connected to the second cladding layer thereof and a second electrode electrically connected to the first cladding layer thereof and to the second cladding layer of the second modulator arm waveguide, the second modulator arm waveguide having a third electrode electrically connected to the first cladding layer thereof.

The present invention also provides a method for manufacturing a semiconductor Mach-Zehnder modulator comprising the steps of forming a combination mesa structure overlying a substrate, the combination mesa structure including an input optical waveguide, first and second input branch optical waveguides branching off the input optical waveguide, first and second modulator arm waveguides optically coupled to the first and second input branch optical waveguides, respectively, first and second output branch optical waveguides optically coupled to the first and second modulator arm waveguides, respectively, an output optical waveguide optically coupled to both the first and second output branch optical waveguides, each of the undoped waveguides having consecutively a first cladding layer of a first conductivity type, an optical guide layer, a second cladding layer of a second conductivity type, and forming a first electrode electrically connected to the second cladding layer of the first modulator arm waveguide, a second electrode connected to the first cladding layer of the first modulator arm waveguide and the second cladding layer of the second modulator arm waveguide, and a third electrode connected to the first cladding layer of the second modulator arm waveguide.

With the semiconductor Mach-Zehnder modulator according to the present invention and manufactured by the method of the present invention can be driven in a push-pull modulation by using a single driver, which is advantageous over the conventional Mach-Zehnder modulator having two drivers and an associated timing generator for push-pull drive thereof.

BRIEF DESCRIPTION OF THE DRAWINGS

FIGS. 1A and 1B are perspective view and cross-sectional view, respectively, of a conventional semiconductor Mach-Zehnder modulator;

PREFERRED EMBODIMENTS OF THE INVENTION

Figure 2:
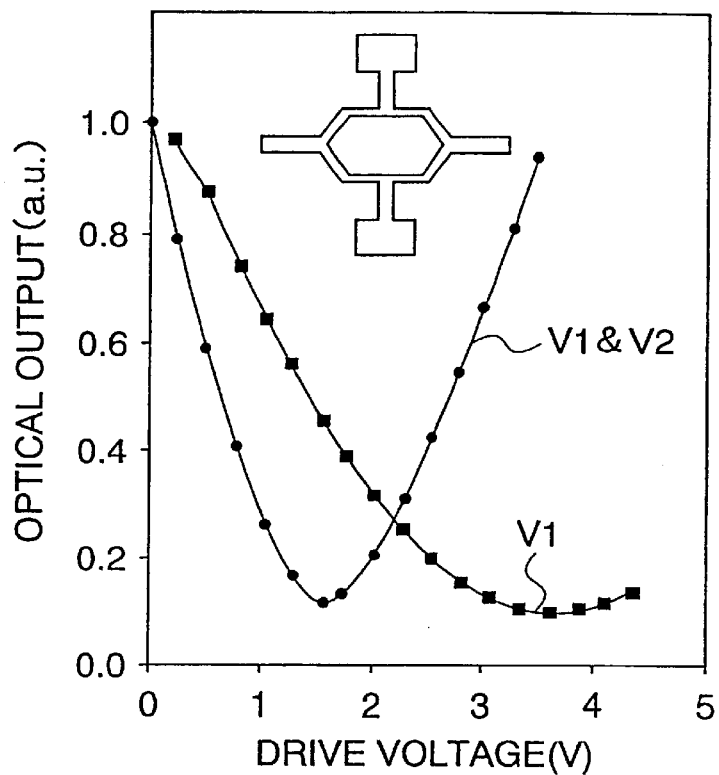
FIG. 2 is a graph of optical output plotted against drive voltage in the conventional modulator for single arm drive and double arm drive.
Figure 3:
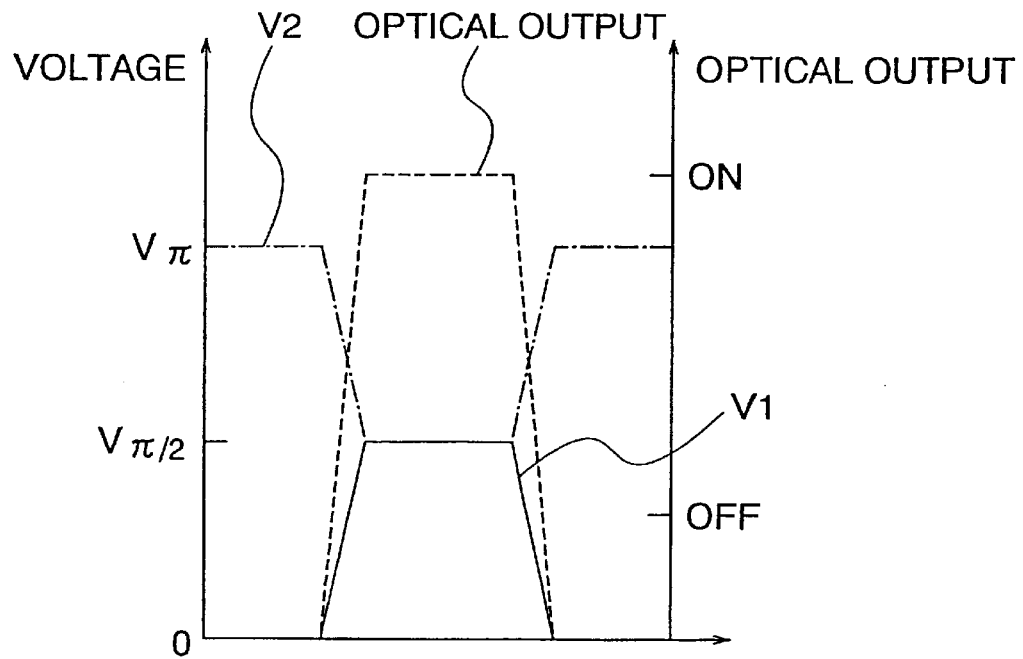
FIG. 3 is a timing chart of double arm drive in conventional modulator.
Figure 4:
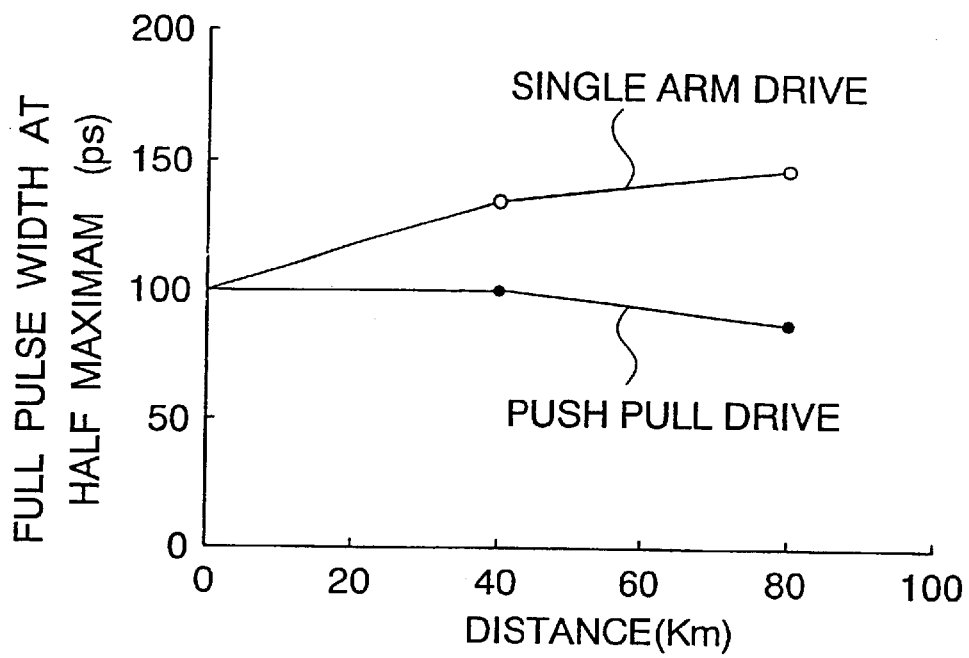
FIG. 4 is a graph of full pulse width at half maximum plotted against transmission distance for single arm drive and double arm drive.
Figure 5:
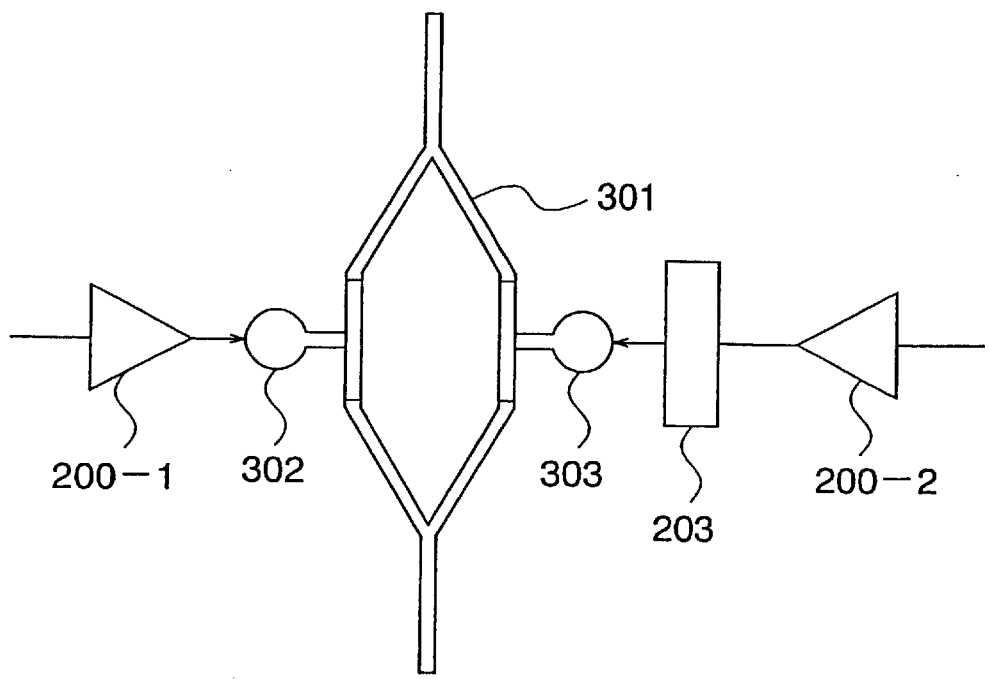
FIG. 5 is a schematic block diagram of a conventional double arm drive modulator.
Figure 6:
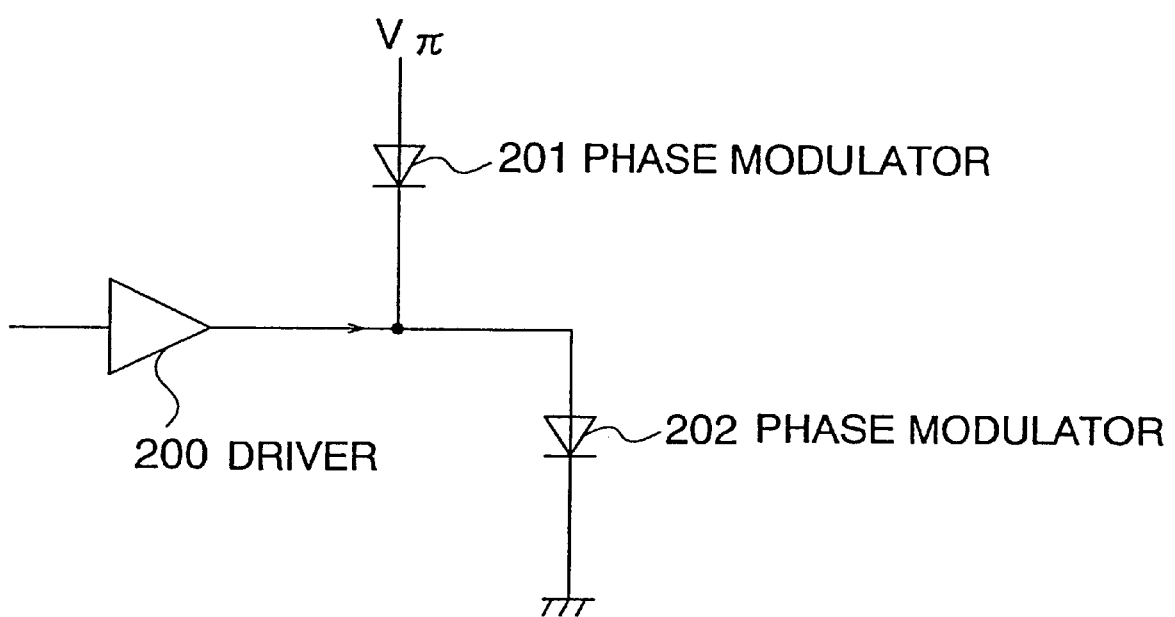
FIG. 6 is a schematic diagram of a semiconductor Mach-Zehnder modulator according to an embodiment of the present invention.

Referring to FIG. 6, a semiconductor Mach-Zehnder modulator according to an embodiment of the present invention comprises a pair of phase modulator arms (referred to as simply modulator arms) 201 and 202 and a driver 200 for driving the phase modulator arms 201 and 202 in a push-pull modulation. P-electrode of phase modulator arm 201 is maintained at a constant negative voltage of $V_\pi$ and n-electrode of the phase modulator arm 201 is driven by a driver 200. P-electrode of phase modulator arm 202 connected to n-electrode of modulator arm 201 is driven by driver 202 and n-electrode of phase modulator arm 202 is maintained at a ground potential.

In operation, drive voltage changes between the negative potentials $V_\pi$ and $V_{\pi/2}$ so that both the modulator arms are 201 and 202 are driven in a push-pull modulation. $V_\pi$ may be −4 volts, for example, depending on the length of the modulator arms. When the drive voltage assumes $V_{\pi/2}$, both the modulator arm 201 is driven by a reverse bias voltage of $V_{\pi/2}$ and provides output signals having the same phase shift of $V_{\pi/2}$ with respect to the input optical signal, which provides an ON state of the output optical signal. When the drive voltage assumes $V_\pi$, modulator arm 201 is driven with zero volt, which makes a phase shift of zero in the output of modulator arm 201, whereas modulator arm 202 is driven with $V_\pi$, which makes a phase shift of π in the output of modulator arm 202. That is, the outputs of both modulator arms 201 and 202 are cancelled by each other due to the opposite phase therebetween, thereby providing an OFF state of the output optical signal. In this manner, the Mach-Zehnder modulator of FIG. 6 operates in a push-pull modulation by using a single driver.

Figure 7A:
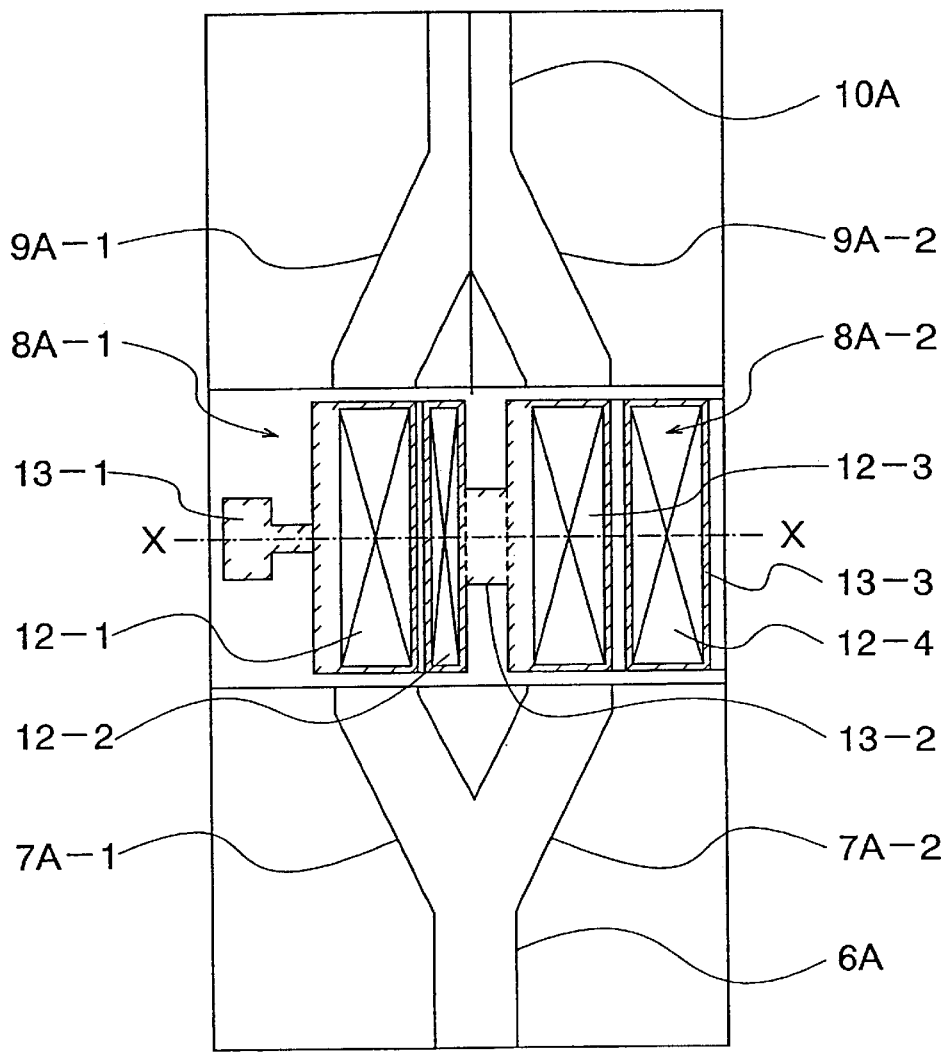
FIGS. 7A and 7B are top plan view and cross-sectional view, respectively, of the semiconductor Mach-Zehnder modulator of FIG. 6.

Referring to FIG. 7A showing the configuration of the semiconductor Mach-Zehnder modulator of FIG. 6, the modulator comprises a combination mesa structure including an input optical waveguide mesa 6A, a pair of input branch optical waveguide mesas 7A-1 and 7A-2 branching off the input optical waveguide mesa 6, a pair of modulator arm mesas 8A-1 and 8A-2 for modulating optical signals supplied from input optical waveguide mesas 7A-1 and 7A-2, respectively, a pair of output branch optical waveguide mesas 9A-1 and 9A-2 receiving optical outputs from phase modulator mesas 8A-1 and 8A-2, respectively, and an output optical waveguide mesa 10A for receiving a combined output from the output optical waveguide mesas 9A-1 and 9A-2.

Figure 7B:
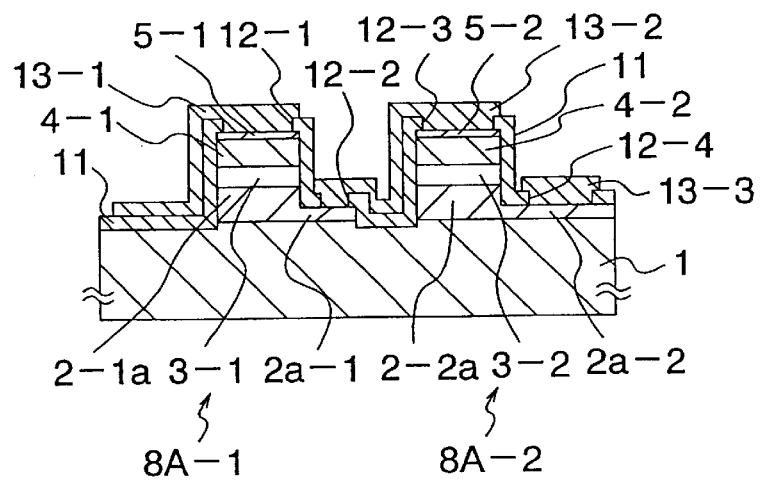

Referring to FIG. 7B showing a cross-sectional view taken along X—X in FIG. 7A, each of the modulator mesas 8A-1 and 8A-2 of the combination mesa structure comprises an n-type InP cladding layer 2-1a or 2-2a, an optical waveguide layer 3-1 or 3-2, a p-type InP cladding layer 4-1 or 4-2, a p-type cap layer 5-1 or 5-2 consecutively formed on the main surface of the semi-insulating substrate 1 to form the mesa structure, with n-type cladding layer 2-1a of modulator arm 8A-1 connected to p-type InGaP cap layer 5-2 of modulator arm 8A-2 through an electrode 13-2. The optical guide layers 3-1 and 3-2 are formed as multi-quantum-well (MQW) layers.

Figure 8A:
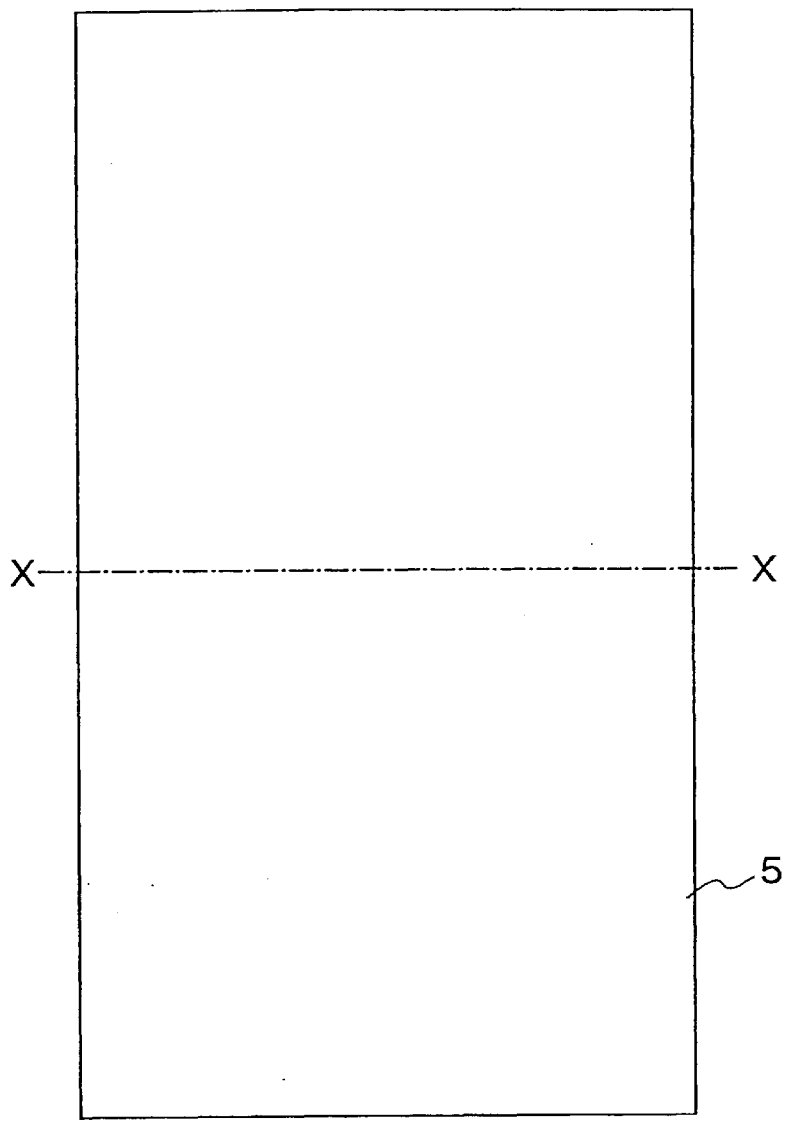
FIGS. 8A and 8B are top plan view and cross-sectional view, respectively, of the modulator of FIGS. 7A and 7B at a step of fabrication process thereof.
Figure 8B:
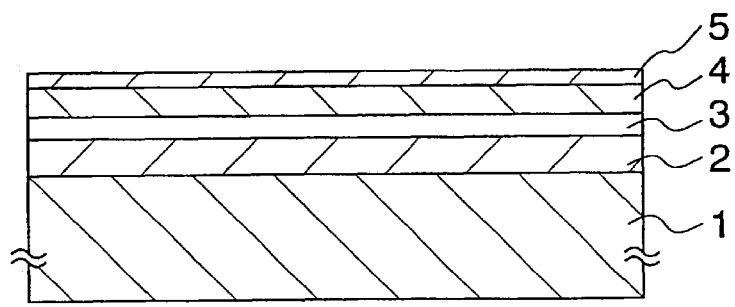

A method for manufacturing the semiconductor Mach-Zehnder modulator of the present embodiment will be described with reference to FIGS. 7A and 7B to FIGS. 10A and 10B, wherein FIG. 8B, for example, is a cross-sectional view taken along line X—X in FIG. 8A, and the same applies to other drawings. As shown in FIG. 8B, 1 μm-thick n-type InP cladding layer 2 having a carrier density of $1\times10^{18}$ cm$^{-3}$, optical waveguide layer 3 of a MQW structure, which has 30-cycle layer combinations each including 10 nm-thick undoped InP barrier film and 10 nm-thick undoped $In_yGa_{1-y}As_wP_{1-w}$ quantum well film having a wavelength composition of 1.52 μm, 1.0 μm-thick p-type InP cladding layer 4 having a carrier density of $5\times10^{17}$ cm$^{-3}$ and 0.2 μm-thick p-type $In_{0.53}Ga_{0.47}As$ cap layer 5 having a carrier density of $1\times10^{18}$ cm$^{-3}$ are consecutively grown on a (100) face of a semi-insulating InP substrate 1 by using a metal-organic vapor phase epitaxial (MOVPE) technique.

Figure 9A:
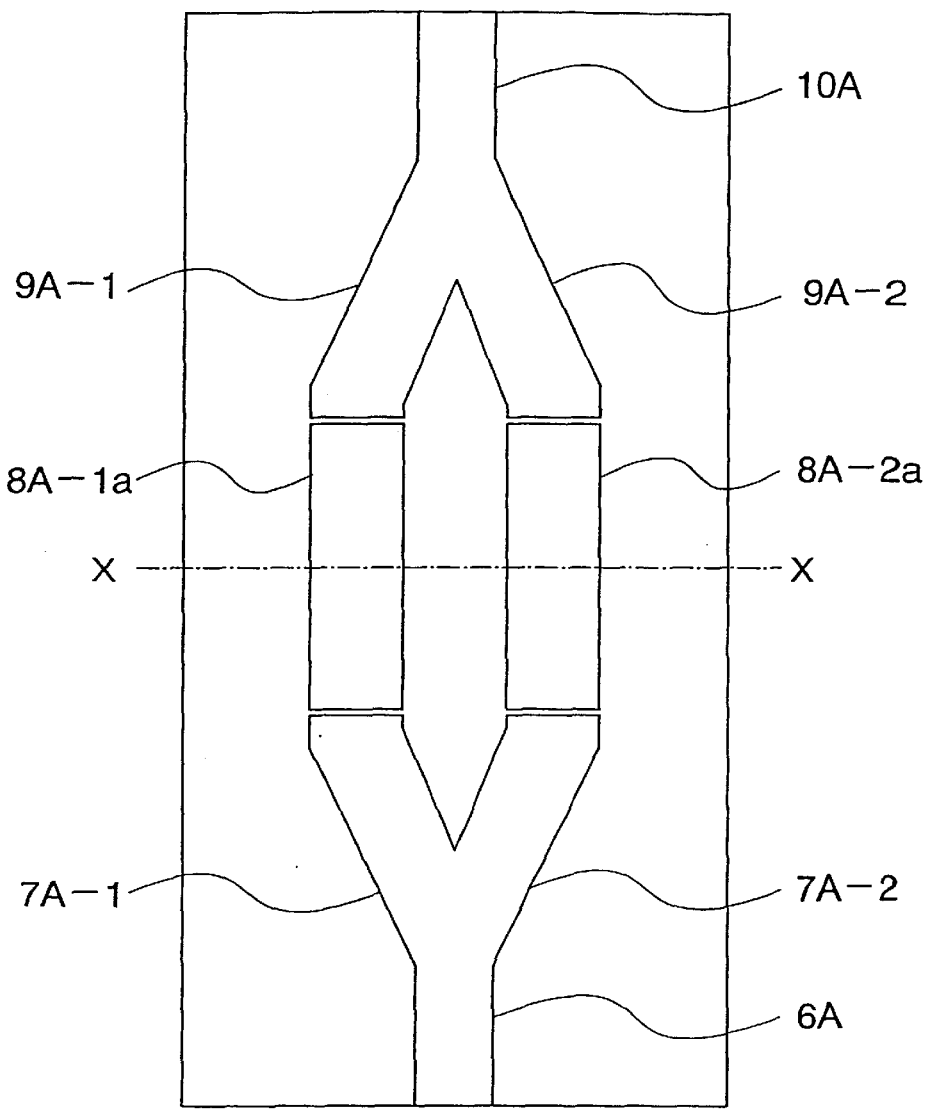
FIGS. 9A and 9B are top plan view and cross-sectional view, respectively, of the modulator of FIGS. 7A and 7B at another step of fabrication process thereof.
Figure 9B:
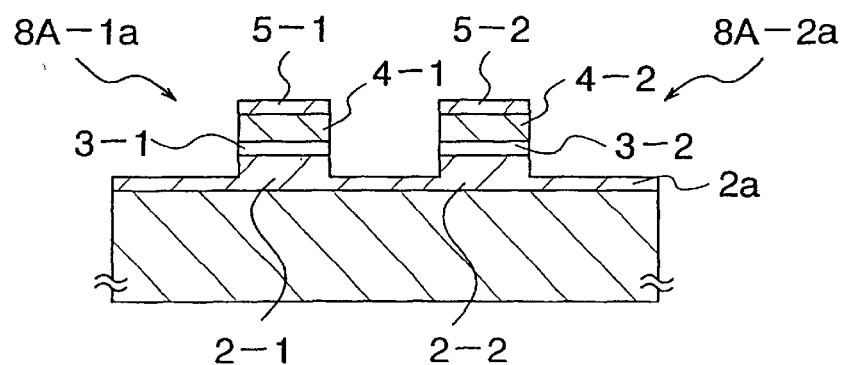

Subsequently, InGaAs cap layer 5, InP cladding layer 4, optical waveguide layer 3 and a top portion of n-InP cladding layer 2 are selectively etched by a reactive ion beam etching (RIBE) technique using a suitable mask to form a combination mesa structure including input waveguide mesa 6A, a pair of branch waveguide mesas 7A-1 and 7A-2, a pair of modulator arm mesas 8A-1a and 8A-2a, a pair of branch waveguide mesas 9A-1 and 9A-2, and output waveguide mesa 10A, as shown in FIGS. 9A and 9B. A small space of 2 μm or lower is disposed between each modulator arm mesa 8A-1a or 8A-2a and branch waveguide mesa 7A-1, 7A-2, 9A-1 or 9A-1.

Figure 10A:
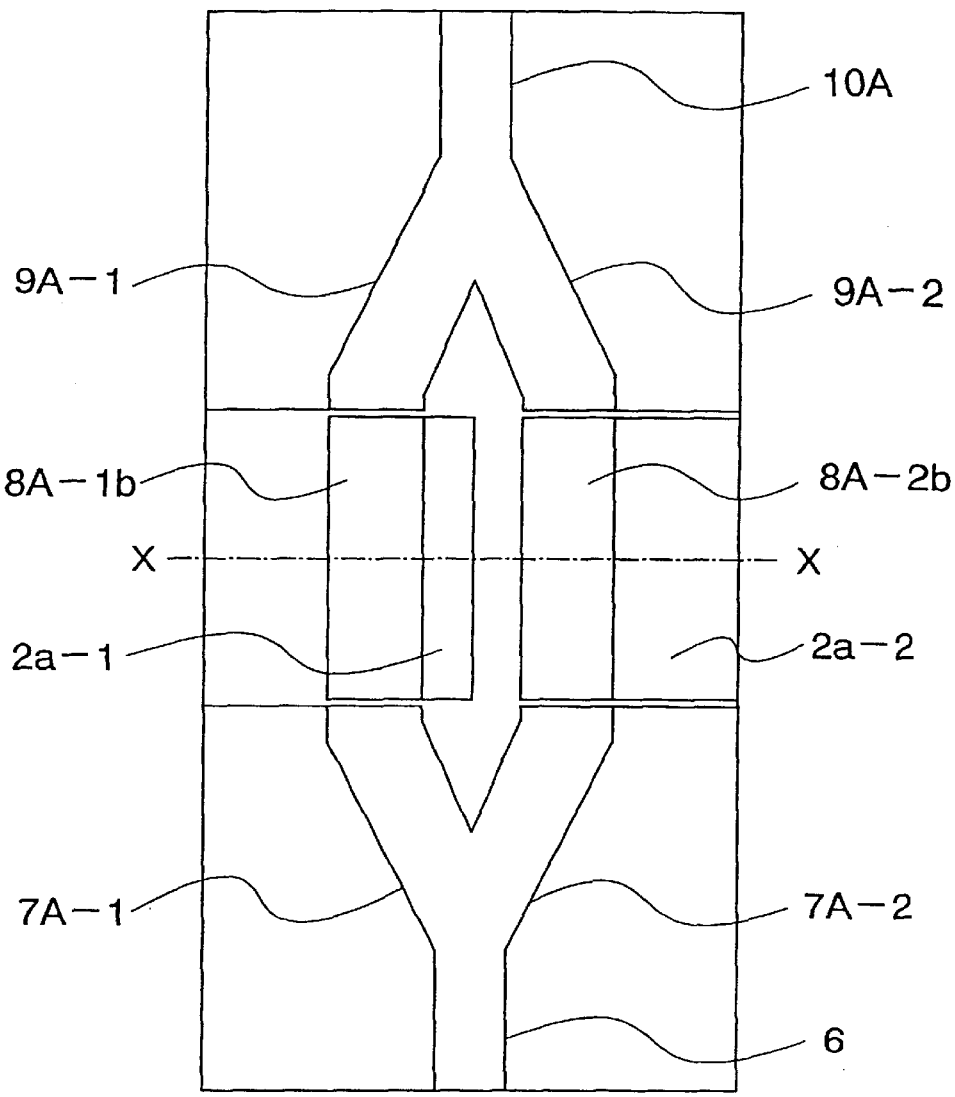
FIGS. 10A and 10B are top plan view and cross-sectional view, respectively, of the modulator of FIGS. 7A and 7B at another step of fabrication process thereof.
Figure 10B:
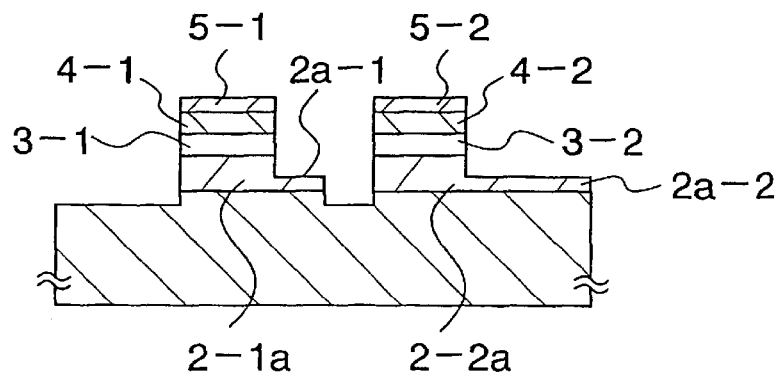

Subsequently, the remaining bottom portion of n-type cladding layer 2a together with a small top portion of the substrate 1 is selectively removed by a RIBE technique using a suitable mask, as shown in FIGS. 10A and 10B, to electrically separate modulator arm mesa 8A-1b from modulator arm mesa 8A-2b and each modulator arm mesa 8A-1b or 8A-1b from the rest of the mesas. In this etching step, contact regions 2a-1 and 2a-2 of the InP cladding layer connected to respective modulator arm mesas 8A-1 and 8A-2 are left.

Subsequently, as shown in FIGS. 7A and 7B, 0.3 μm-thick $SiO_2$ film 11 is deposited on the entire surface, followed by selective etching thereof using a suitable mask to form openings 12-1, 12-2, 12-3 and 12-4 for exposing cap layer 5-1 of modulator arm mesa 8A-1, contact region 2a-1, cap layer 5-2 of modulator arm mesa 8A-2 and contact region 2a-2, respectively. Thereafter, Ti/Pt/Au films are formed on the entire surface by an evaporation technique, followed by patterning thereof to form electrodes 13-1, 13-2 and 13-3 which are in contact with p-type $In_{0.53}Ga_{0.47}As$ cap layer 5-1 of modulator arm mesa 8A-1, contact region 2a-1 of n-type cladding layer 2-1a as well as p-type $In_{0.53}Ga_{0.47}As$ cap layer 5-2 of modulator arm mesa 8A-2, and contact region 2a-2 of n-type cladding layer 2-2a, respectively, to complete the structure of FIGS. 7A and 7B.

The semiconductor Mach-Zehnder modulator thus fabricated has a length of 500 μm for both the modulator arm mesas 8A-1 and 8A-2, which length enables a reverse bias voltage of 4 volts applied between both the electrodes of modulator arm to provide a phase shift of π in the output optical signal, i.e., in this modulator, $V_\pi \approx -4$ volts.

Figure 11A:
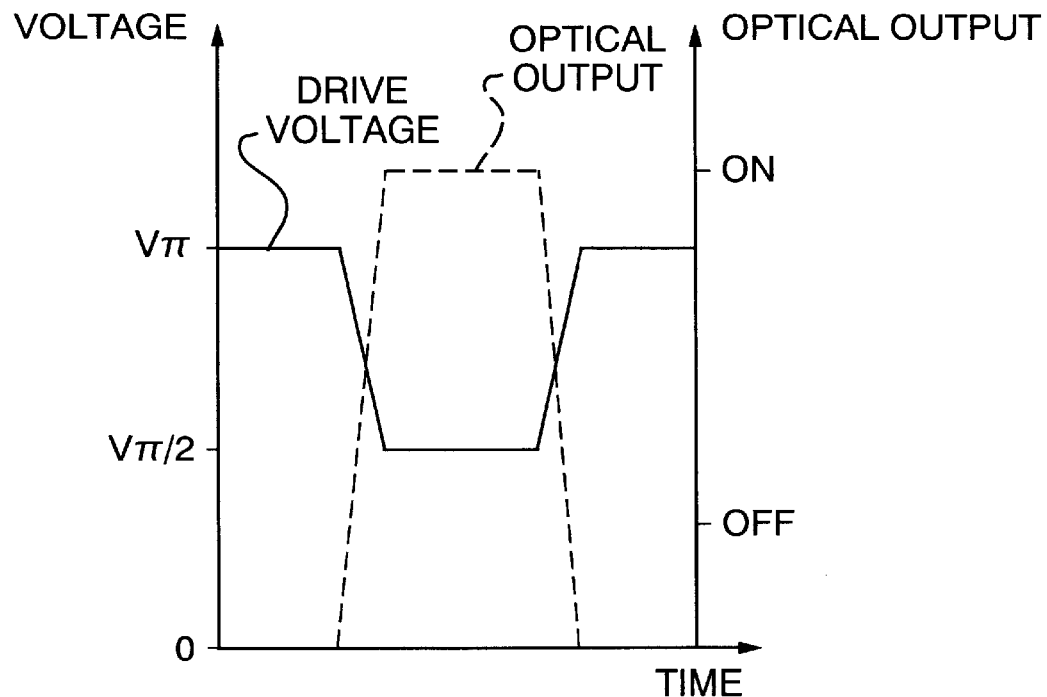
FIG. 11A is timing chart of the modulator of the first embodiment.
Figure 11B:
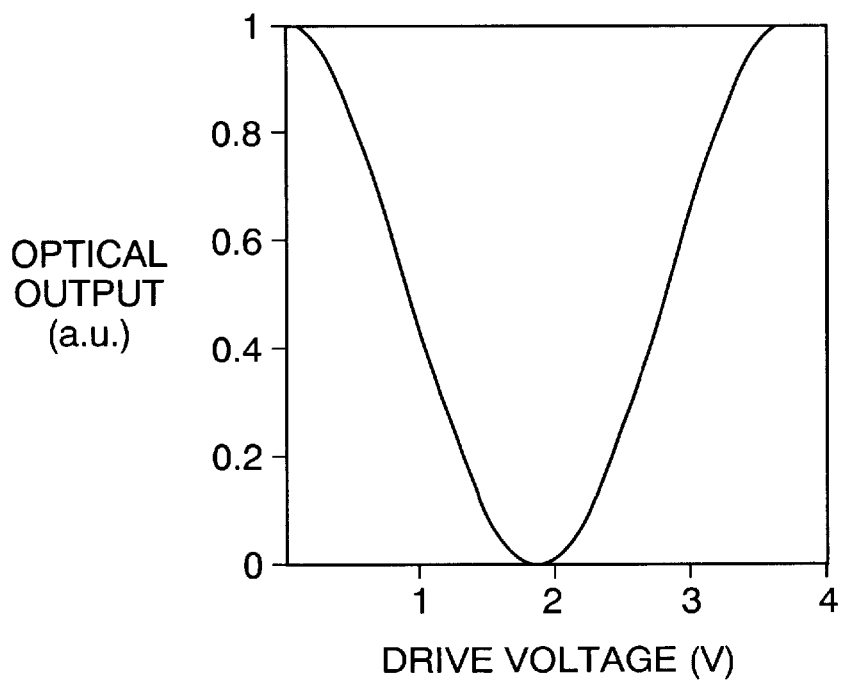
FIG. 11B is a graph of optical output plotted against drive voltage in the first embodiment.

In operation, $V_\pi$ and zero volts are applied to electrodes 13-1 and 13-3, respectively, whereas a drive voltage changing between $V_{\pi/2}$ and $V_\pi$ in a square waveform is supplied to contact region 2a-1 of modulator arm 8a-1 and p-type cap layer 5-2 of modulator arm 8A-2 through electrode 13-2. FIG. 11A shows a timing chart for the drive voltage and the optical output of the modulator of FIGS. 7A and 7B. When the drive voltage assumes a high (negative) level of $V_\pi$, modulator arm 8A-1 is applied with zero volt between both the electrodes thereof and modulator arm 8A-2 is applied with a reverse bias voltage of $V_\pi$ between both the electrodes thereof. Accordingly, a phase difference of π appears between both modulator arms 8A-1 and 8A-2, resulting in an OFF state of the output branch waveguide 10A.

When the drive voltage assumes a low level of $V_{\pi/2}$, both modulator arms 8A-1 and 8A-2 are applied with a reverse bias voltage of $V_{\pi/2}$. Accordingly, a phase difference of zero appears between the outputs of both modulator arms 8A-1 and 8A-2, resulting in an ON state of the output branch waveguide 10A. Thus, by applying a drive voltage changing between $V_\pi$ and $V_{\pi/2}$ to electrode 13-2, a push-pull modulation can be obtained in the semiconductor Mach-Zehnder modulator of the present embodiment. In this configuration, driving by a single driver enables a simple driving, which does not require a timing generator.

The voltage $V_{\pi/2}$ may be replaced by $V_\pi/2$ in the above embodiment, which may, however, degrade the ON/OFF ratio of the modulator due to the nonlinear characteristic of the modulator arms.

In an alternative of the above fabrication process, another process may be employed, wherein 0.3 μm-thick n-type InP layer is deposited on the entire surface of a semi-insulating substrate, followed by consecutive selective growth of 0.7 μm-thick n-type InP layer, optical guide layer, p-type InP cladding layer, and p-type $In_{0.53}Ga_{0.47}As$ cap layer by using $SiO_2$ film as a growth prevention mask to form the structure of FIGS. 9A and 9B. Other steps may be similar to the steps as described before.

Figure 12A:
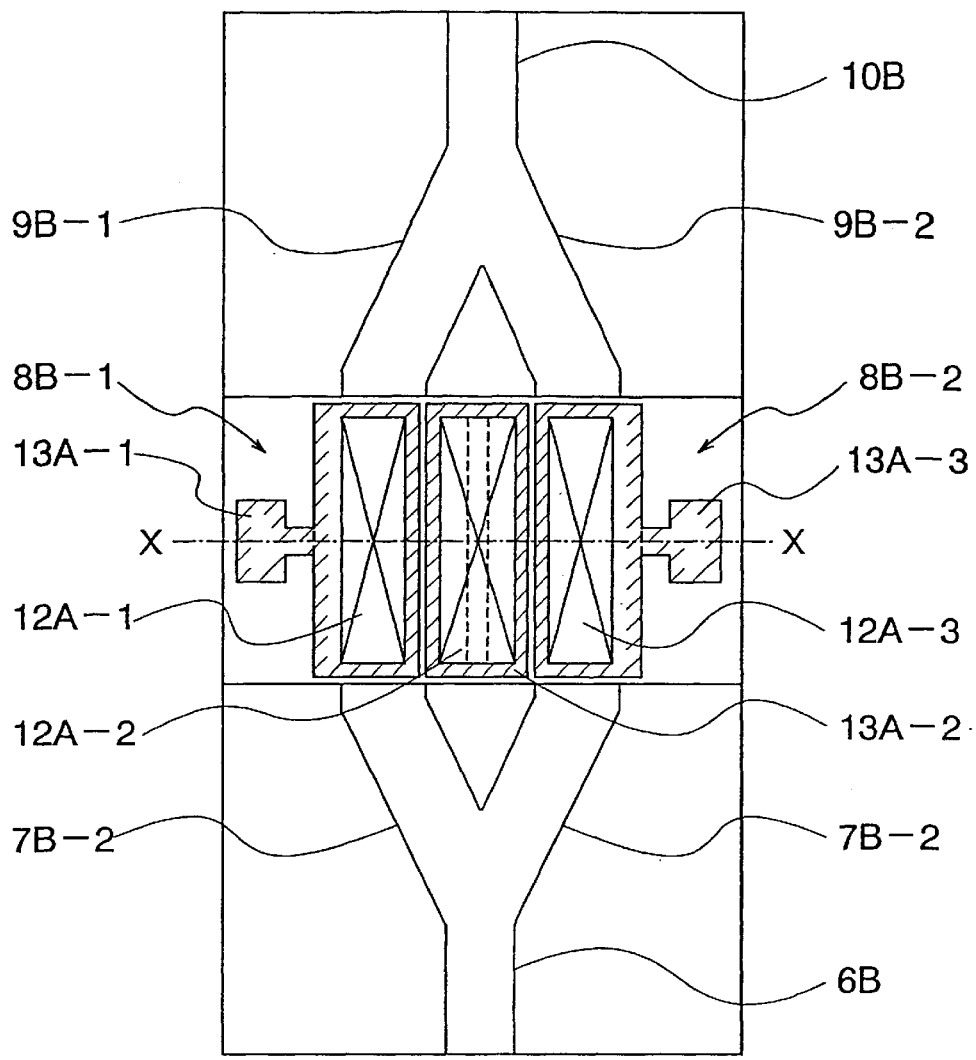
FIGS. 12A and 12B are top plan view and cross-sectional view, respectively, of a semiconductor Mach-Zehnder modulator according to a second embodiment of the present invention.
Figure 12B:
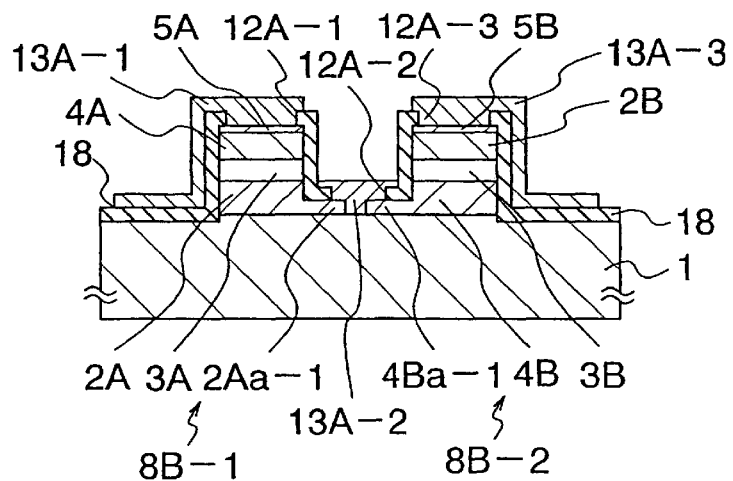

FIGS. 12A and 12B show, similarly to FIGS. 7A and 7B, a semiconductor Mach-Zehnder modulator according to a second embodiment of the present invention. The semiconductor Mach-Zehnder modulator of the present embodiment is similar to the first embodiment except that modulator arm mesa 8B-2 of the present embodiment has p-type InP cladding layer 4B, optical guide layer 3A, n-type InP cladding layer 2B and n-type $In_{0.53}P_{0.47}As$ cap layer 5B, that both contact region 2A$a$-1 connected to n-type InP cladding layer 2A of modulator arm 8B-1 and contact region 4B$a$-1 connected to p-type cladding layer 4B of modulator arm 8B-2 are connected through electrode 13A-2, and that n-type $In_{0.53}P_{0.47}As$ cap layer 5B of modulator arm 8B-2 is connected to electrode 13A-3.

Figure 13A:
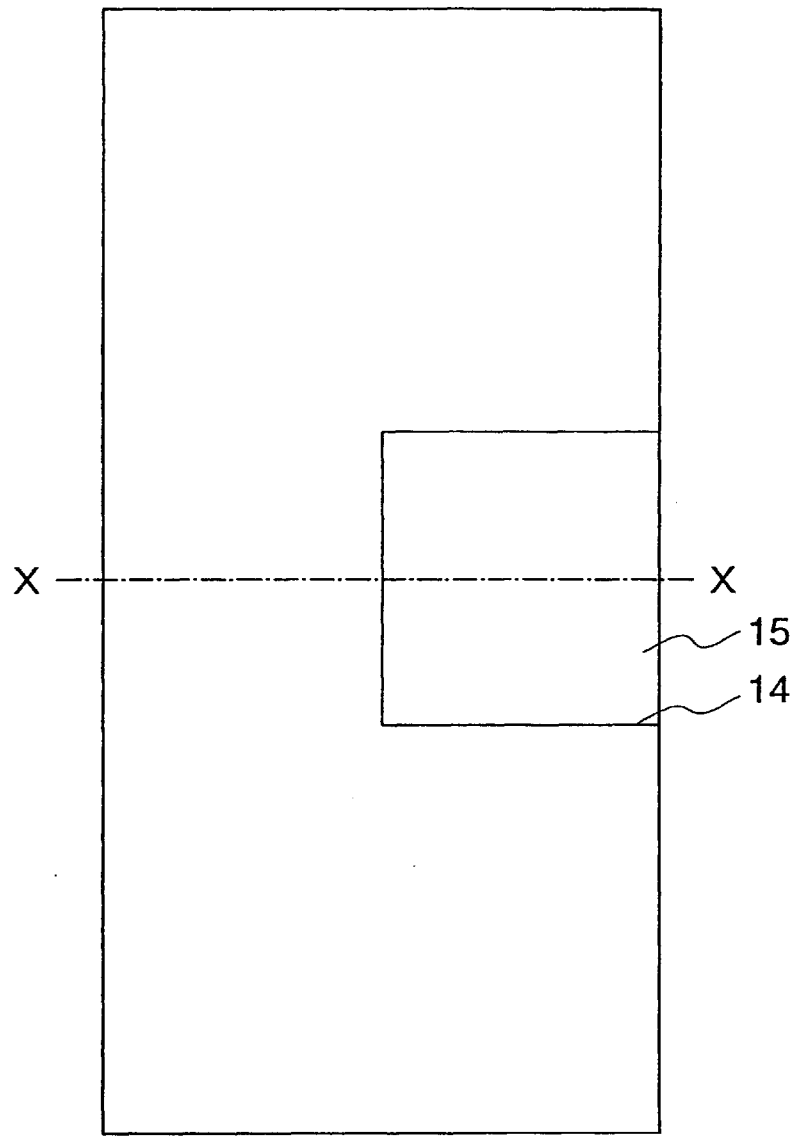
FIGS. 13A and 13B are top plan view and cross-sectional view, respectively, of the modulator of FIGS. 12A and 12B at a step of fabrication process thereof.
Figure 13B:
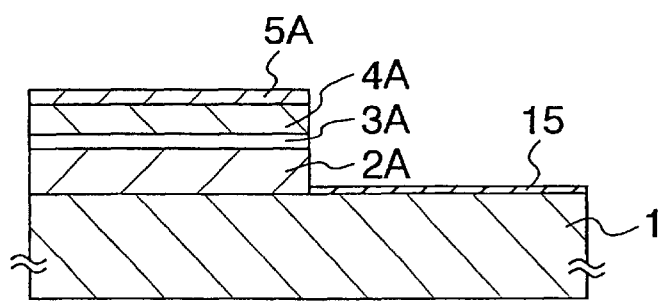

In the manufacture of the semiconductor Mach-Zehnder modulator of the present embodiment, 0.1 $\mu$m-thick $SiO_2$ film 15 is formed on a (100) face of a semi-insulating InP substrate 1 as a rectangular growth prevention mask, followed by consecutive deposition of 1.0 $\mu$m-thick n-type InP cladding layer 2A having a carrier density of $1\times10^{18}$ cm$^{-3}$, MQW optical guide layer 3A which is similar to optical guide layer 3 in the first embodiment, 1.0 $\mu$m-thick p-type InP cladding layer 4A having a carrier density of $5\times10^{17}$ cm$^{-3}$, and 0.2 $\mu$m-thick p-type $In_{0.53}Ga_{0.47}As$ cap layer 5A having a carrier density of $5\times10^{18}$ cm$^{-3}$ by using a MOVPE technique, as shown in FIGS. 13A and 13B.

Subsequently, layers from cap layer 5A to a top portion of n-type InP cladding layer 2A are selectively removed by etching to form a combination mesa structure including an input waveguide mesa 6B, a pair of branch waveguide mesas 7B-1 and 7B-2, a modulator arm mesa 8B-1, a pair of branch waveguide mesas 9B-1 and 9B-2, and an output waveguide mesa 10B. One edge of modulator arm mesa 8B-1 is in contact with the near edge of $SiO_2$ mask film 15, whereas one end of each of branch waveguide mesas 7B-2 and 9B-2 is in contact with corresponding edge of $SiO_2$ mask film 15.

After removing $SiO_2$ mask film 15, another 0.1 $\mu$m-thick $SiO_2$ film is formed on the entire surface, followed by patterning thereof by a photolithographic technique to form $SiO_2$ mask film 16 covering the entire surface except for the most part of the area which was covered by $SiO_2$ mask film 15. That is, the growth region not covered by $SiO_2$ mask film 16 has a shape similar to the shape of $SiO_2$ growth prevention mask film 15 and is a little smaller than $SiO_2$ mask film 15.

Figure 15A:
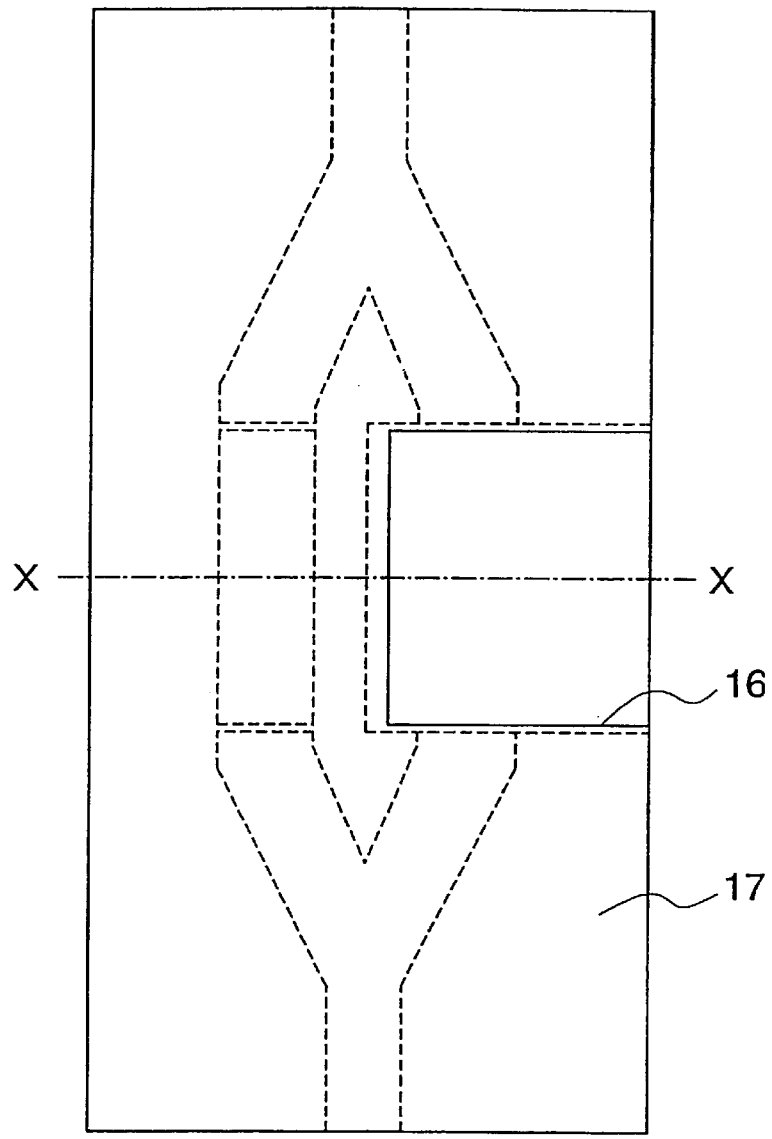
FIGS. 15A and 15B are top plan view and cross-sectional view, respectively, of the modulator of FIGS. 12A and 12B at another step of fabrication process thereof.
Figure 15B:
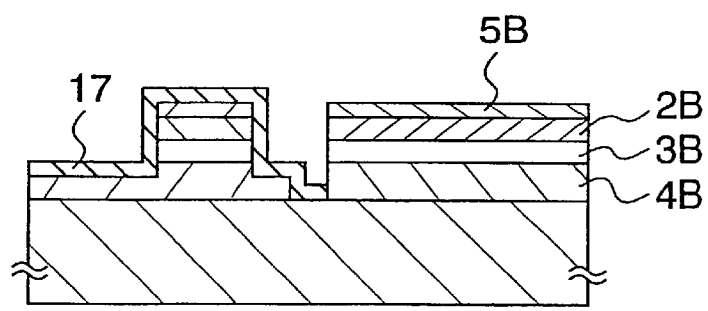

Subsequently, a MOVPE process is employed to form consecutively 1.0 $\mu$m-thick p-type InP cladding layer 4B having a carrier density of $1\times10^{18}$ cm$^{-3}$, MQW optical guide layer 3B similar to optical guide layer 3A, 1.0 $\mu$m-thick n-type InP cladding layer 2B having a carrier density of $5\times10^{17}$ cm$^{-3}$, and 0.2 $\mu$m-thick n-type $In_{0.53}Ga_{0.47}As$ cap layer 5B having a carrier density of $1\times10^{18}$ cm$^{-3}$ on the growth region not covered by $SiO_2$ mask film 16, as shown in FIGS. 15A and 15B.

Figure 16A:
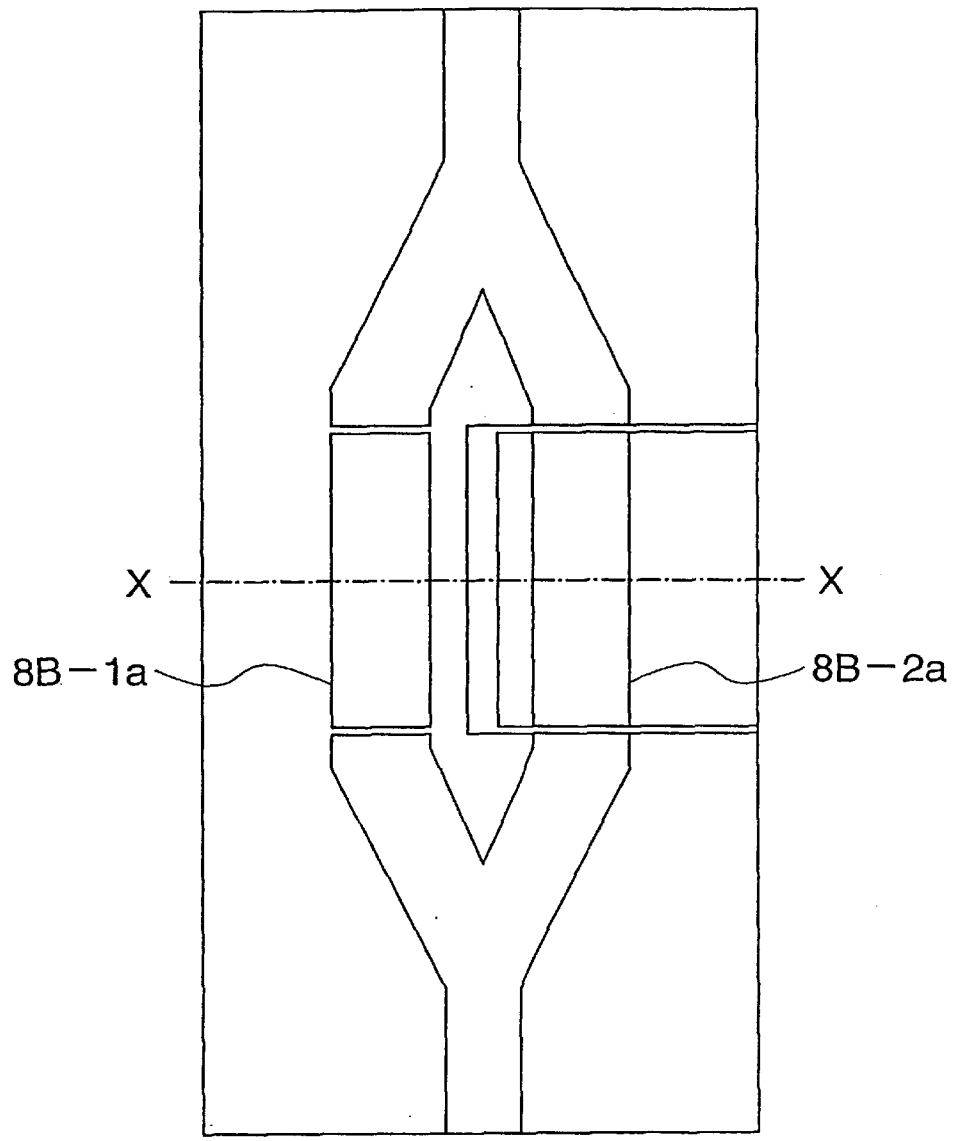
FIGS. 16A and 16B are top plan view and cross-sectional view, respectively, of the modulator of FIGS. 12A and 12B at another step of fabrication process thereof.
Figure 16B:
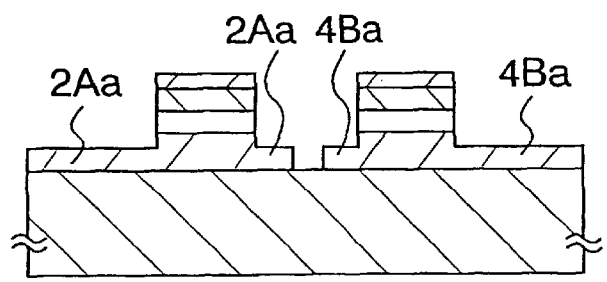
Figure 17A:
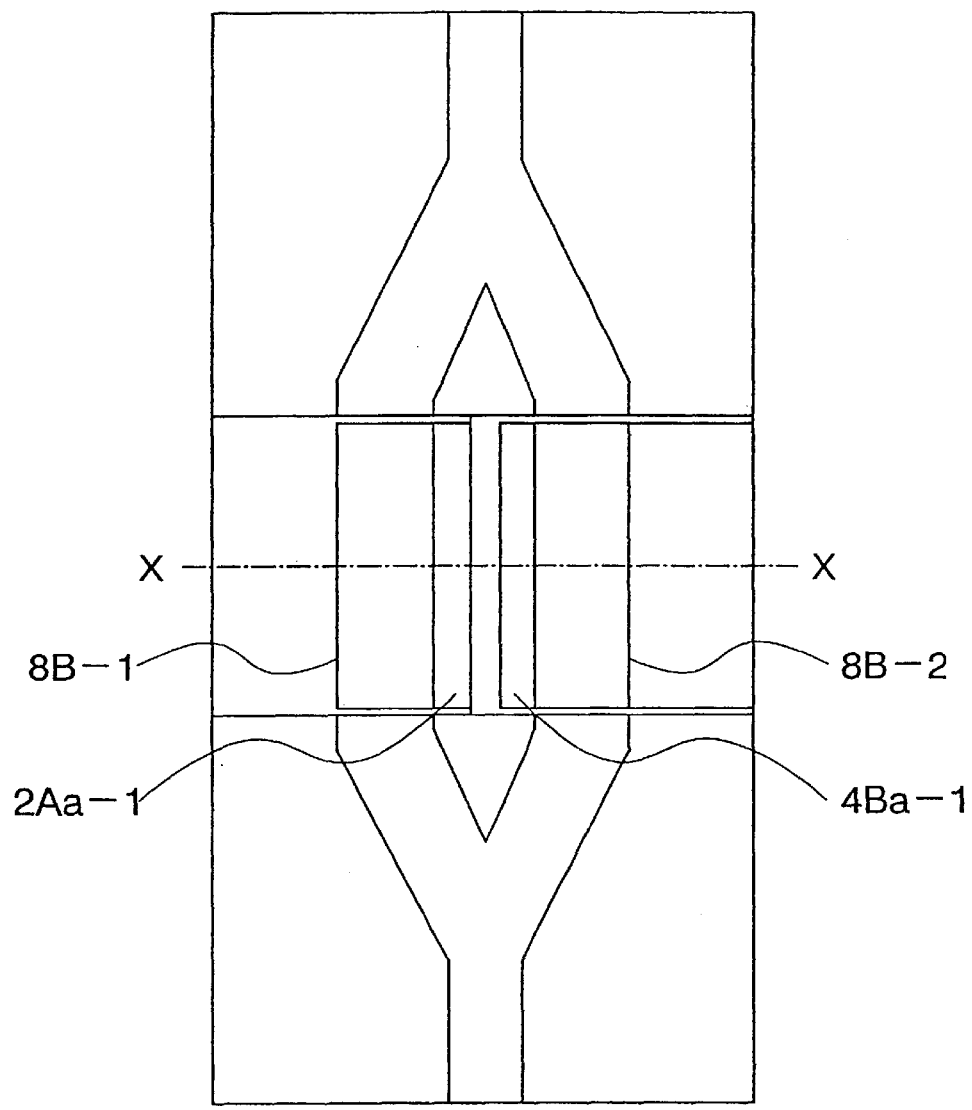
FIGS. 17A and 17B are top plan view and cross-sectional view, respectively, of the modulator of FIGS. 12A and 12B at another step of fabrication process thereof.
Figure 17B:
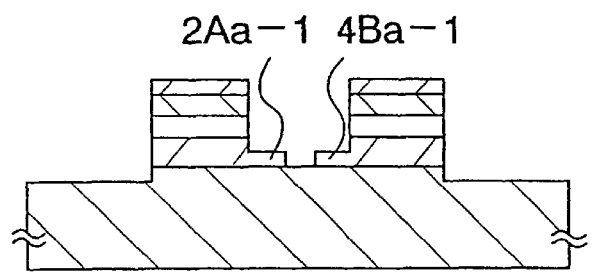

Subsequently, layers from cap layer 5B to a top portion of cladding layer 4B are patterned to form a modulator arm mesa 8B-2$a$ which has an input end opposed to an open end of branch waveguide mesa 7B-2 with a small space disposed therebetween, an output end opposed to an open end of branch waveguide mesa 9B-2 with a small space disposed therebetween, and a side opposed to the near side of modulator arm mesa 8B-1$a$, as shown FIG. 16A and 16B. The small space between adjacent waveguides is equal to or smaller than 2 $\mu$m. $SiO_2$ mask film 16 is then removed, followed by patterning the remaining portions 2A$a$ and 2B$a$ of n-typ cladding layers 2A and 2B as well as a small top portion of substrate 1 to leave contact regions 2A$a$-1 and 2B$a$-1.

Subsequently, as shown in FIGS. 12A and 12B, 0.3 $\mu$m-thick $SiO_2$ film 18 is deposited on the entire surface, followed by etching thereof to form openings 12A-1, 12A-2 and 12A-3 for exposing a portion of cap layer 5A of modulator arm mesa 8B-1$a$, contact regions 2A$a$-1 and 2B$a$-1, and a portion of cap layer 5B of modulator arm mesa 8B-2$a$, respectively. Ti/Pt/Au films are then deposited by an evaporation technique on the entire surface, followed by patterning thereof to form electrodes 13A-1, 13A-2 and 13A-3 for cap layer 5A, contact regions 2A$a$-1 and 4B$a$-1, and cap layer 5B, respectively.

In the present embodiment, the layer structure of modulator arm mesa 8B-2$a$ is an inverse of the layer structure of modulator arm mesa 8B-1$a$. However, the structure of pn-pn junctions is similar in both modulator arm mesas, and accordingly, operation of the modulator of the second embodiment is similar to the first embodiment.

Figure 14A:
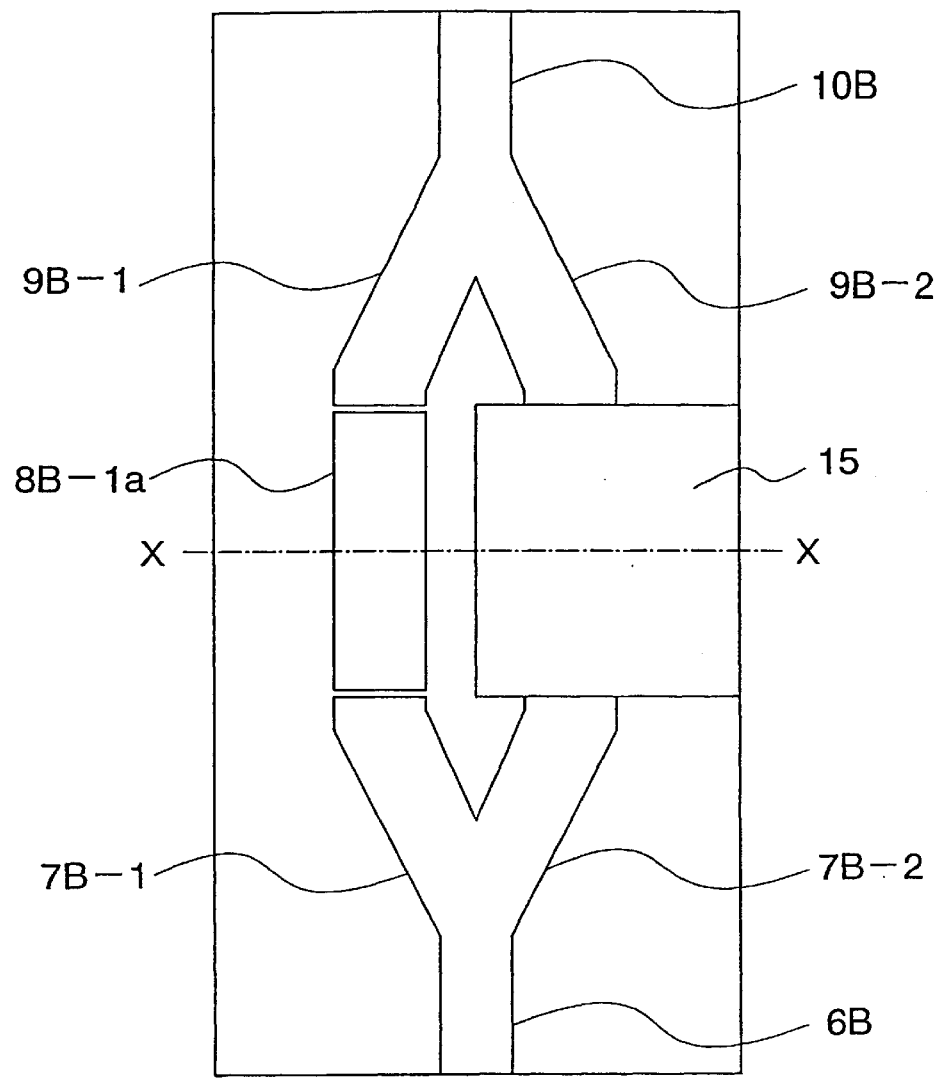
FIGS. 14A and 14B are top plan view and cross-sectional view, respectively, of the modulator of FIGS. 12A and 12B at another step of fabrication process thereof.
Figure 14B:
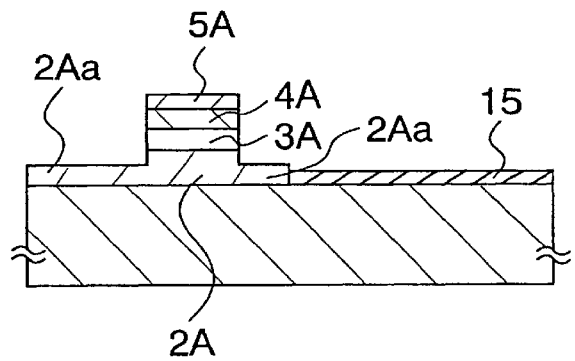

In an alternative of the above fabrication process, another process may be employed, wherein after forming first $SiO_2$ mask film 15 for growth prevention in FIGS. 13A and 13B, 0.3 $\mu$m-thick n-type InP layer is deposited, followed by formation of second $SiO_2$ growth prevention mask covering the entire surface other than the region for forming the mesas. Then, 0.7 $\mu$m-thick n-type cladding layer, optical guide layer, p-type cladding layer, and p-type $In_{0.53}Ga_{0.47}As$ cap layer are consecutively grown to form a structure similar to the structure of FIGS. 14A and 14B. Subsequently, after removing second $SiO_2$ mask film and forming third $SiO_2$ mask film 17 such as shown in FIGS. 15A and 15B, 0.3 $\mu$m-thick p-type InP cladding layer is formed, followed by removal of third $SiO_2$ mask film 17 and formation of fourth $SiO_2$ mask film for growth prevention not shown. Then, 0.7 $\mu$m-thick p-type InP cladding layer, optical guide layer, n-type InP cladding layer, and n-type $In_{0.53}Ga_{0.47}As$ are consecutively formed by selective growth technique to form the structure of FIGS. 16A and 16B. Subsequent steps are similar to those as described before.

In the above embodiments, InP based compound semiconductors are used including the MQW structure formed by $InP/In_xGa_{1-x}As_yP_{1-y}$. The MQW structure may be formed by $InP/In_xAl_{1-x}As$ films, $In_xGa_{1-x}As_yP_{1-y}/In_yGa_{1-v}Al_wAs_{1-w}$ films, or $GaAs/Al_xGa_{1-x}As$ based semiconductors. Further, the structure of the optical guide layer, structure or location of the driver or wavelength may be selected depending on the design.

Since the above embodiments are described only for examples, the present invention is not limited to the above embodiments and various modifications or alterations can be easily made therefrom by those skilled in the art without departing from the scope of the present invention.

What is claimed is:

1. A method for manufacturing a semiconductor Mach-Zehnder modulator comprising the steps of forming a combination mesa structure overlying a substrate, said combination mesa structure including an input optical waveguide, first and second input branch optical waveguides branching off said input optical waveguide, first and second modulator arm waveguides optically coupled to said first and second input branch optical waveguides, respectively, first and second output branch optical waveguides optically coupled to said first and second modulator arm waveguides, respectively, an output optical waveguide optically coupled to both said first and second output branch optical waveguides, each of said waveguide having consecutively a first cladding layer of a first conductivity type, an optical guide layer, a second cladding layer of a second conductivity type, and forming a first electrode electrically connected to said second cladding layer of said first modulator arm waveguide, a second electrode connected to said first cladding layer of said first modulator arm waveguide and said second cladding layer of said second modulator arm waveguide, and a third electrode connected to said first cladding layer of said second modulator arm waveguide.

2. A method as defined in claim 1, further comprising the steps of forming consecutively said first cladding layer, said active layer and said second cladding layer on an entire surface of said substrate, and selectively etching said second cladding layer, said active layer and a top portion of said first cladding layer to form said combination mesa structure.

3. A method as defined in claim 2, further comprising, after said selectively etching step, the step of selectively removing a bottom portion of said first cladding layer to leave a contact region for said first cladding layer of each of said first and second modulator arm waveguides.

4. A method as defined in claim 1, further comprising the steps consecutively forming said first cladding layer, said active layer and said second cladding layer of said combination mesa structure except for said second modulator arm waveguide, and growing consecutively said second cladding layer, said active layer and said first cladding layer for said second modulator arm waveguide.

5. A method as defined in claim 3, wherein said growing step is effected by a selective growth technique.

6. A method as defined in claim 4, further comprising the step of forming a contact region for said first cladding layer of said first modulator arm waveguide and a contact region for said second cladding layer of said second modulator arm waveguide.

\* \* \* \* \*